3,554,771
SOLID GELATED ALCOHOLIC FOAM
Sol B. Wiczer, 3235 Sleepy Hollow Road, Falls Church, Va. 22042, and Lloyd S. Luther, 4740 Connecticut Ave. NW., Washington, D.C. 20008
No Drawing. Continuation-in-part of application Ser. No. 628,276, Apr. 4, 1967. This application Aug. 11, 1967, Ser. No. 659,869
Int. Cl. A23 7/08
U.S. Cl. 99—189
10 Claims

ABSTRACT OF THE DISCLOSURE

Alcoholic products are gelated to a solid with methyl cellulose or gelatin as preferred gelating agents, the alcoholic product preferably being a beverage, typically a cordial, rum or whiskey, the solidified product being loaded in a dispensing container and pressurized with a non-toxic propellant gas such as nitrous oxide or perfluorocyclobutane to exude the solidified foam, and is generally useful as an edible topping for desserts or the like.

---

This application is a continuation-in-part of our co-pending application, Ser. No. 628,276, filed Apr. 4, 1967, now abandoned.

This invention relates to a beverage alcohol in edible flowable solid gel or foamy gel form packaged in and dispensed from a pressurized container with a non-toxic propellant gas, primarily said gel being thereby a solid gelatinous foam as an edible alcoholic product useful as an edible topping for desserts such as cake, ice cream, ices, puddings and the like.

According to the present invention, an alcoholic beverage, typically cordials, brandies, rums or whiskeys that might be used as a flavoring topping upon puddings, ice cream, ices, cakes and the like, is converted to gel form by adding a gelating agent thereto in quantity sufficient to solidify the alcoholic beverage. The solidified beverage is encased in a pressure-resistant container together with a non-toxic propellant gas of the character of nitrous oxide, dichlor difluor methane ("Freon"), perfluoro cyclobutane ("Freon C–318"), carbon dioxide or the like so that the product may be expanded from the pressurized container by manipulation of the valve, releasing the pressurized product. Where the propellant gas has substantial solubility in the gel, it is expelled as a foamy edible alcoholic gel to a desired extruded, solid shape, forming an attractive as well as a solid alcoholic beverage fortified foamy gel. Each of the propellant gases listed above would have at least slight solubility in the alcoholic gel and, consequently, may propel and dispense the gel as a foaming product upon release of the gelled product through the container nozzle.

However, certain containers are constructed to separate the propellant gas from the gel content by a movable partition which operates as a piston, both separating the gel from the propellant gas as well as moving under pressure against the gelled product to expel it from the nozzle of the container by manual manipulation of the valve for release. In that construction the gelled product is expelled from the container without being formed. Either type of gelated alcohol product may be produced and varied in character from foamy to non-foamy by choosing the right type of container. In the event that a non-foaming gel is to be dispensed from the container as described, the character of the propellant gas may be varied even more widely since for this type of gel it is unnecessary that the propellant gas have any substantial degree of solubility in the gel, since it is not actually stored in contact with the gel but rather is separated therefrom by such partitioning.

In practicing the invention an edible gelating agent such as methyl cellulose, gelatin, or other edible gel-forming substances are preferably added to the alcoholic beverage in quantity sufficient to form a stable, pressure-fluidizable gel, preferably a foamy gel.

The gel-forming agent is mixed with the alcoholic beverage, typically a cordial, whiskey, rum, or the like, which may also have incorporated therein other desirable topping substances such as finely-ground nuts, sugar, syrup and flavoring agents to provide the solidified beverage in a fluidizable, solid, gel, preferably foamy gel, when expelled from the pressurized container. For instance, the alcoholic liquid in beverage strength ranging up to about 150 proof, such as from 25 to 150 proof, is mixed with from ½ to 10% by weight of a gelating agent such as methyl cellulose or gelatin, whereby a gel which has a stable, solid, finally-foamed body is formed. The gel also may have flavoring agents added to modify to the desired taste, bouquet and consistency as desired, and it is then filled into a pressurized container. The container is then pressurized with a propellant gas such as nitrous oxide, Freon or carbon dioxide, perfluoro cyclobutane, or the like, to a desired propellant pressure such as 50 to 150 p.s.i.g.

Sometimes where the gel is to be used as a topping for a frozen or cold ice, ice cream, custard, pudding or the like, the container enclosing the alcoholic gelated topping product under pressure is itself refrigerated to avoid imparting a warming effect to the cold dessert. Conversely, it is sometimes useful to apply the topping to a hot food and, for this purpose, the container and its contents may be warmed before use to moderate temperatures.

Moreover, such raised and lowered container storage temperatures sometimes may impart a thickening or thinning effect to the alcoholic gelated beverage product therein in which the quantity of gelating agent per se may be adjusted in the above-stated range to allow the evolved topping gel to have the proper body or consistency at its temperature of actual use. For instance, a solidified rum including a small amount of butter may form a desirable gelated topping to be served in a heated form, whereby the quantity of gelating agent may be adjusted to apply the solidified rum in gel form heated and with a proper solid consistency at the raised temperature.

Alternately, a sweet cordial to be used as a topping for ice cream and ices or frozen custard or cold pudding or the like might be treated with gelating agent and refrigerated before use to evolve the cold gel as a topping upon the ice, ice cream, etc., at a correspondingly low temperature, but nevertheless to contain the gelating agent at adjusted consistency to provide a gel of adequate thickness at the low temperature.

In general a cooled beverage product requires somewhat more gelating agent of the methyl cellulose type than a heated product to produce a gelated beverage topping of the same body.

The container may also have its outlet valve shaped to mold the extruded gel to desired wavy appearance or contour whereby upon application to dessert or crackers as an hors d'oeuvre, cake or the like, the beverage gel enhances the appearance as well as the taste.

The following examples illustrate the practice of this invention:

EXAMPLE I

A strong 120 proof rum is warmed to a temperature of 105° F. and mixed homogeneously with a trace of butter and with sufficient 4,000 cps. of methyl cellulose to form a 3% solution on a weight volume basis. The addition of dry methyl cellulose to the hot rum immediately thickens it as the homogeneous mixture is formed. The product is put in a pressure-resistant container and is pressurized hot to 100 p.s.i.g. with Freon gas and then allowed to cool. It is stored at ambient temperature. Just before use the can is placed in a container of hot water at about 105° F. and then by depression of the valve the gelated buttered rum is evolved as a hot gelated solid foamy coating on hot cross buns to impart thereto a rum flavor as a gelated topping. The product per se can be further modified by addition of sugars, icings, chocolate, etc., to desired flavor and taste, and may also be made from weaker beverage rums and cordials such as about 80 to 90 proof.

EXAMPLE II

A sweet cordial of the character of Cointreau, Cherry Heering, Dubonnet, Benedictine, Creme de Menthe, Drambuie, according to taste, is mixed with 5% weight volume of 4,000 cps. methyl cellulose, liquid and solid being cooled to 35° F. and mixed until a deformably stable gel is formed. The gel is filled into a pressure-resistant container with a valve and is pressurized with nitrous oxide to 100 p.s.i.g. and low 35° F. temperature. The product is refrigerated to +35° F. and maintained cold until ready for use. It is then applied as a creamy stable gel for use as a topping on cold desserts; typically, ice cream, gelatin, custard, ices, diced fruits, and may be applied to flavor ordinary cracked ice, frozen milk, etc. Alternately, it can be applied to frozen cakes, pies, as well as salads and as a decorative and beverage flavoring topping.

EXAMPLE III

Brandies, cognacs, and whiskies, typically scotch, bourbon, rye and the like, are gelated as in Example II with methyl cellulose and placed in valve-operated containers pressurized with nitrous oxide and are sprayed upon ice cubes or cracked ice and the ice itself may be eaten with a spoon with the gelated product coated thereover.

EXAMPLE IV

Example II is repeated, using creme de menthe with 7% of crystalline gelatin, the liqueur and gelatin being mixed at about 120° F. until a completely homogeneous solution is formed and is then cooled in a refrigerator to approximately 40° F. and sets to a firm gelated product in about two hours. The gel is then filled into a pressure-resistant container and is pressurized to 100 p.s.i.g. at 40° F. with perfluoro cyclobutane. The product is then used as a creamy gel topping for a cold dessert such as ice cream and remains an attractive foamy solid topping, retaining its shape at atmospheric temperature long after the ice cream has melted.

EXAMPLE V

The product of Example IV after cooling in a refrigerator until it has began to thicken and set, but is still fluid for easy mixture, is mixed in equal volumes with a preformed whipped cream until a creamy whipped product is obtained with the smooth, foamy taste of whipped cream, but typically flavored with creme de menthe. That product remains stable in the refrigerator as a typical whipped cream topping for months of storage. It was placed in a container and pressurized as in Example IV and was expelled as a tasty topping upon a pre-set gelatin pudding, markedly improving the appearance and flavor.

Various modifications will occur to those skilled in the art. Various flavor and bouquet imparting additives may be supplied for improving the taste and appearance of the product as a topping for mixed drinks, cocktails, aperitifs, etc. The gelated product may be applied as a topping upon various solid foods for imparting an appetizing and attractive appearance. The gelated alcoholic product applied to a dessert such as an ice or a cake may be ignited and served flaming to impart an attractiveness to the product in addition to the improved taste.

Accordingly, it is intended that the examples hereinabove be regarded as exemplary and not limiting except as defined in the claims appended hereto.

We claim:

1. A pressurized food container product comprising a strong, alcoholic beverage selected from the group consisting of cordials, brandies, rums and whiskies and having an alcoholic strength in the range of 25 to 150 proof which is solidified to a pressure-deformable, substantially solid alcoholic gel with a gelating agent selected from the group consisting of gelatin and methyl cellulose in quantities sufficient to form said stable pressure-deformable gel at temperatures in the range of about 35 to 105° F., said alcoholic gel being confined in an aerosol container under sufficient pressure of a non-toxic propellant gas selected from the group consisting of nitrous oxide and perfluoro cyclobutane to expel said gel upon release from said container as a solid, foamed gelatinous alcoholic product.

2. The product as defined in claim 1 wherein the alcoholic gel converted to is a foamy product when it is expelled from the container.

3. The product as defined in claim 1 wherein the gelating agent is methyl cellulose.

4. The product as defined in claim 1 wherein the gelating agent is gelatin.

5. The product as defined in claim 1 wherein the propellant gas is nitrous oxide.

6. The product as defined in claim 1 wherein the propellant gas is perfluoro cyclobutane.

7. The product as defined in claim 1 wherein the pressurized container is fitted with an outlet duct shaped to constrain the evolved product to a wavy shaped, solid, foamy extrudate, attractively useful as a decorative and flavorful topping for a comestible product.

8. The product as defined in claim 1 wherein the product is mixed with a selected edible coloring agent for enhanced attractiveness.

9. The product as defined in claim 1 wherein the gelating agent is a member of the group consisting of methyl cellulose and gelatin, the gel being further mixed with whipped cream.

10. A pressurized food container product comprising a strong, alcoholic beverage selected from the group consisting of cordials, brandies, rums and whiskies and having an alcoholic strength in the range of 25 to 150 proof which is solidified to a pressure-deformable, substantially solid alcoholic gel with a gelating agent in quantities sufficient to form said stable pressure-deformable gel at temperatures in the range of about 35 to 105° F., said alcoholic gel being confined in an aerosol container under sufficient pressure of a non-toxic propellant gas selected from the group consisting of nitrous oxide and perfluoro cyclobutane to expel said gel upon release from said container as a solid, foamed gelatinous alcoholic product.

References Cited

UNITED STATES PATENTS

| | | | |
|---|---|---|---|
| 1,783,133 | 11/1930 | Ohle et al. | 99—30UX |
| 2,113,596 | 4/1938 | Lilienfeld | 99—30 |
| 2,778,737 | 1/1957 | Du Bridge | 99—134X |
| 2,849,323 | 8/1958 | Young | 99—189 |
| 3,081,223 | 3/1963 | Gunning et al. | 99—189UX |
| 3,366,494 | 1/1968 | Bower et al. | 99—139X |
| 3,369,913 | 2/1968 | Livengood et al. | 99—189 |
| 1,607,364 | 11/1926 | Raffetto | 99—30UX |

FOREIGN PATENTS 326,447  3/1930  Great Britain _____ 99—30

OTHER REFERENCES

Industrial Gums, Whistler et al., Academic Press, New York (1959), pp. 565, 566, 579, 581 and 585.

NORMAN YUDKOFF, Primary Examiner

F. E. DRUMMOND, Assistant Examiner

U.S. Cl. X.R.

99—30, 129; 222—192; 206—56